Oct. 7, 1969  R. D. WIGHT  3,470,760
COLUMN-MOUNTED CENTRALLY-LOCATED TRANSMISSION SHIFT CONTROL
Filed Jan. 26, 1968  2 Sheets-Sheet 1

INVENTOR
Robert D. Wight
BY
A. M. Weiter
ATTORNEY

Oct. 7, 1969  R. D. WIGHT  3,470,760
COLUMN-MOUNTED CENTRALLY-LOCATED TRANSMISSION SHIFT CONTROL
Filed Jan. 26, 1968  2 Sheets-Sheet 2

INVENTOR
Robert D. Wight
BY
a.m. Neiter
ATTORNEY

United States Patent Office 3,470,760
Patented Oct. 7, 1969

3,470,760
COLUMN-MOUNTED CENTRALLY-LOCATED TRANSMISSION SHIFT CONTROL
Robert D. Wight, Saginaw, Mich., assignor to General Motors Corporation, Detroit, Mich., a corporation of Delaware
Filed Jan. 26, 1968, Ser. No. 700,819
Int. Cl. G05g 11/00
U.S. Cl. 74—484                              2 Claims

ABSTRACT OF THE DISCLOSURE

Disclosed herein is a steering column mounted transmission shift linkage in which the shift control member is mounted centrally of the vehicle steering wheel. Rotation of the shift control member, by the operator, produces linear movement through a threaded cam to the shift tube. During a steer maneuver, the shift control member and the threaded cam rotate with the steering wheel while the shift tube remains stationary and the transmission drive setting is unaffected.

---

This invention relates to transmission shift controls and more particularly to steering column mounted transmission shift controls wherein the operator control is centrally located on the steering column.

The transmission shift control, to be centrally located, must be capable of rotating relative to the steering mechanism to provide transmission drive ratio changes and also must rotate in unison with the steering mechanism, during a steer maneuver, without changing the transmission drive ratio.

It is an object of this invention to provide a centrally located steering column mounted transmission control which may be rotated relative to the steering mechanism to effect a transmission drive ratio change and rotated with the steering mechanism, during a steer maneuver, without affecting the transmission drive ratio.

It is another object of this invention to provide in a transmission control a manual control, rotatably mounted on the steering mechanism, having a threaded end engaged with a transfer assembly which transmits the rotary motion of the manual control to a shift tube while converting the motion from rotary to linear.

These and other objects of the invention will be more apparent from the following description of the preferred embodiment of the invention illustrated in the accompanying drawings in which.

Figure 1:
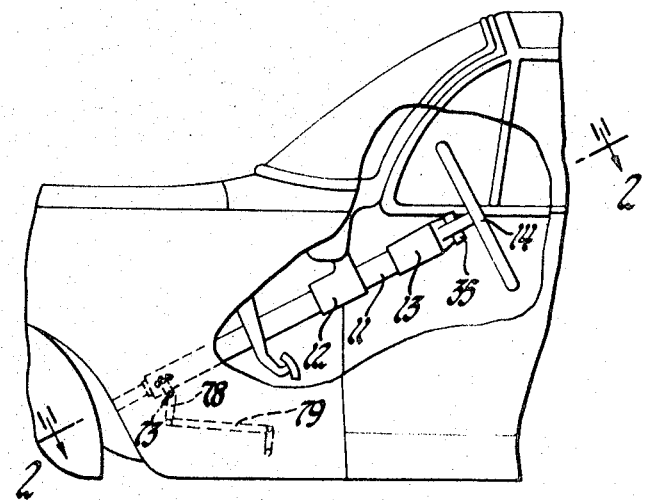
FIGURE 1 is a side elevation showing the steering column in position in the vehicle.
Figure 2:
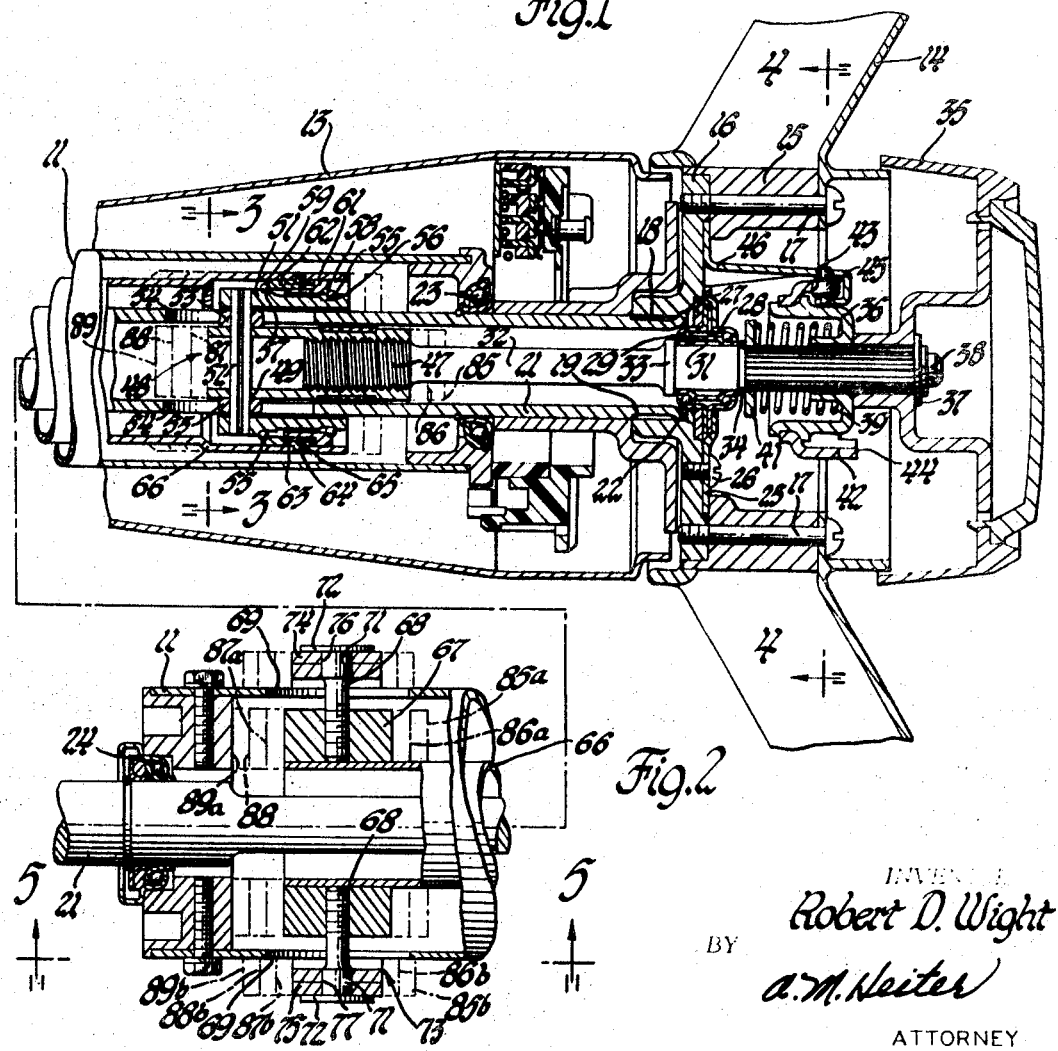
FIGURE 2 is a sectional view of the steering column taken along line 2—2 in FIGURE 1.
Figure 3:
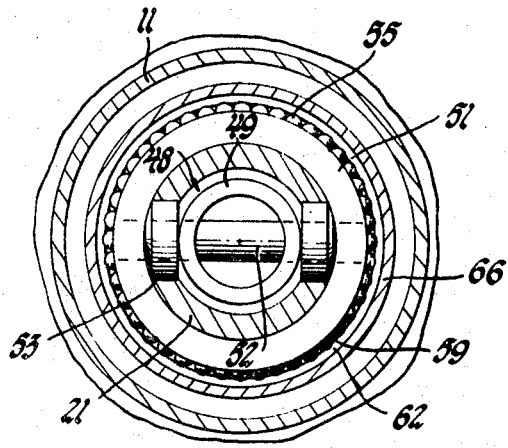
FIGURE 3 is a sectional view taken along line 3—3 in FIGURE 2.
Figure 4:
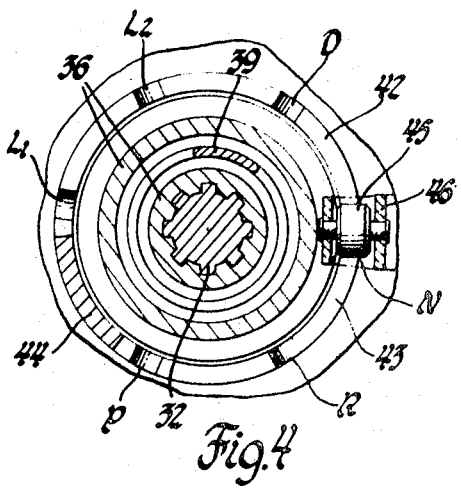
FIGURE 4 is a sectional view taken along line 4—4 in FIGURE 2.
Figure 5:
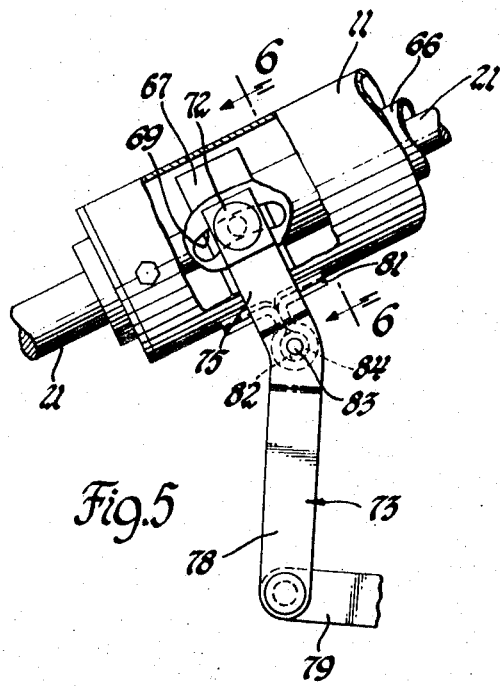
FIGURE 5 is a view, partly in section, taken along line 5—5 in FIGURE 2 showing the lower end of the shift linkage.
Figure 6:
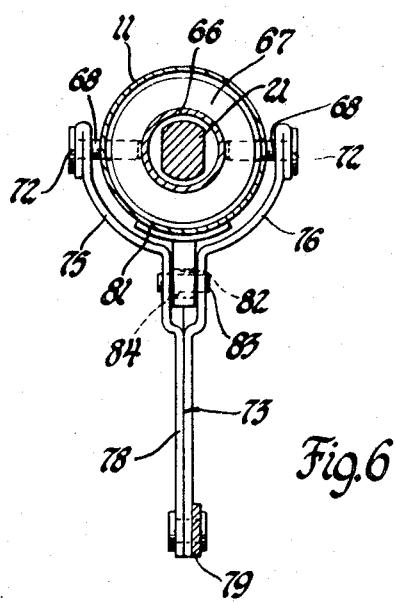
FIGURE 6 is a sectional view taken along line 6—6 in FIGURE 5.

Referring now to the drawings wherein like character references designate like or corresponding components, and particularly FIGURES 1 and 2, there is shown a steering column assembly having a mast jacket or support tube 11, secured to the vehicle body by a support 12, a shroud 13, covering the upper end of the mast jacket 11, and a steering wheel 14 mounted for rotation on the end of the mast jacket 11. The steering wheel 14 is secured to a hub 15 and a flange 16 by a plurality of fasteners 17. The flange 16 has a spline 18 on its inner diameter which meshes with a spline 19 on the steer shaft 21. The upper end 22 of the steer shaft 21 is deformed outward to secure the flange 16 on the spline 19. The steer shaft 21 is rotatably supported in the mast jacket 11 at the upper and lower ends thereof by bearings 23 and 24 respectively. A bearing retaining member 25 is attached to the flange 16 by fasteners 26 and cooperates with a washer 27 to secure the outer race 28 of a bearing 29 to the flange 16. The inner race 31 of the bearing 29 surrounds a portion of the transmission control shaft 32. A shoulder 33 and a retaining ring 34 abut the outer edges of the bearing race 31 to prevent axial movement of the control shaft 32 relative to the flange 16 and the steer shaft 21. The upper end of the control shaft 32 is splined to slidably receive a control knob 35 and a detent cam holder 36. Upward movement of the control knob 35 is limited by a washer 37 secured to the control shaft 32 by a fastener 38. A spring 39, held in compression between a washer 41, which abuts the retaining ring 34, and the cam holder 36, urges the cam holder 36 and the control knob 35 upward against the washer 37. A cam ring 42 is an annular cup-shaped member, secured to the cam holder 36, having five recessed areas P, R, N, D, L2 and L1, on a detent surface 43 as seen in FIGURE 4, to permit the operator to select park, reverse, neutral, a first drive range, a second drive range, and low range respectively. An abutment surface 44 extending upward from the detent surface 43 prevents a full 360° rotation of the control knob 35 and the cam holder 36 relative to the steering wheel 14. A cam roller 45, rotatably mounted on a support 46, selectively engages the recessed areas and cooperates with the spring 39 to resiliently position the control know 35 in the position selected by the operator. The support 46 is formed as part of the bearing retaining member 25 and is, therefore, secured to the steering wheel.

The lower end 47 of the control shaft 32 is in threaded engagement with a transfer assembly, generally designated 48, having a threaded tube member 49, a cylindrical bearing support 51, a roll pin or spring pin 52 pressed into apertures in the tube member 49 and the bearing support 51, and two bushings 53 rotatably supported on the roll pin 52 between the tube member 49 and the bearing support 51. The bushings 53 are confined in axially elongated slots 54 in the steer shaft 21 to prevent relative rotation between the steer shaft 21 and the transfer assembly 48. A plurality of balls 55 are supported by grooves 56 and 57 on the bearing support 51. The balls 55 are also supported in grooves 58 and 59 of bearing races 61 and 62 respectively. The bearing races 61 and 62 are subjected to a pre-load force from a ring 63 of compressible material, such as rubber, to maintain the balls 55 in their grooves. Extending radially outward from the ring 63 are a plurality of locking tabs 64 which are secured in a plurality of apertures 65 in a shift tube 66.

Attached to the outside of the lower end of the shift tube 66 is an annular member 67 which has two diametrically opposed pivot pins 68 threaded thereto and radially extending therefrom. The pivot pins 68 extend through slots 69 in the mast jacket 11 and have a shoulder 71 and an expanded head 72 at their outer end. The slots 69 have a slight arcuate configuration and are axially disposed on the mast jacket 11. The pivot pins are adapated to operatively connect a controlled shift lever 73 to the shift tube 66.

The shift lever 73 is generally a Y shaped member with the upward legs 74 and 75 partly surrounding the mast jacket 11. The legs 74 and 75 have openings 76 and 77, respectively, therein which are pressed onto the shoulders 71 and abut the expanded head 72 of the pins 68.

The other leg 78 of the shift lever 73 is adpated to be connected to a vehicle transmission through linkage such as 79. Attached, as by welding, to the outside of the mast jacket 11 is a pivot support 81 which has an opening 82. A pin 83, rotatably supported in a bushing 84 in the opening 82, is pressed into openings in the legs 75 and 76 adjacent the location where they join with leg 78.

During operation, the transmission shift control, excluding the shift tube 66 and the shift lever 73, must rotate with the steering mechanism when a steer maneuver is performed and rotate relative to the steer mechanism when a transmission ratio change is performed. During a steer maneuver, the operator rotates the steering wheel 14 thereby causing the steer shaft 21 to rotate. The support 46 and cam roller 45 are rotated with the steering wheel. Due to the engagement of the cam roller 45, with one of the recessed areas, such as D, the cam ring 42, cam holder 36, transmission control shaft 32, and the control knob 35 are also rotated with the steering wheel. Due to the engagement of bushings 53 and pin 52 with the elongated slots 54 in the steer shaft 21, the transfer assembly 48 is rotated with the steer shaft 21. The ball bearings 55 permit relative rotation between the transfer assembly 48 and the shift tube 66 which remains stationary during a steer maneuver. To effect a transmission ratio change, the operator rotates the control knob 35 relative to the steering wheel 14 with sufficient force to overcome the detent force or the operator may depress the control knob 35 against the force of spring 39, to relieve the detent force, while rotating the control knob 35. When the control knob 35 is thus rotated, the control shaft 32 is also rotated. The transfer assembly 48, due to the engagement of pin 52 with slot 54, cannot rotate relative to the steer shaft 21 and steering wheel 14. However, due to the threaded engagement between the control shaft 32 and the transfer assembly 48 and the bushings 53 in slots 54, the transfer assembly 48 will move linearly relative to the control shaft 32 and the steer shaft 21 when the control shaft 32 is rotated relative to the steer shaft 14. Upon such rotation the transfer assembly 48 will move to one of the positions 85, 86, 87, 88 or 89, indicated by phantom lines in FIGURE 2. The ball bearing 55 and the ring 63 will not permit relative linear movement between the transfer assembly 48 and the shift tube 66. Therefore, the shift tube 66 will also move linearly to one of the positions 85a, 86a, 87a, 88a or 89a. The linear movement of shift tube 66 is transferred, through the pivot pins 68, pivot support 81 and pin 83, to arcuate motion in shift lever 73, thereby causing the shift lever 73 to assume one of the positions 85b, 86b, 87b, 88b or 89b and the shift linkage 79 to effect the desired shift in the transmission.

Many modifications and variations are possible in light of the above teachings.

What is claimed is:

1. In combination a steering column having a support tube, and rotary steer means including a steer shaft rotatably supported in said support tube; and transmission shift control means including detent means, rotary manual control means within said steer shaft and operatively connected thereto by said detent means, including a control shaft with a threaded portion thereon, transfer means including a transfer pin and a threaded member engaging said threaded portion of said control shaft, a shift tube outside said steer shaft, a bearing, having an inner race and an outer race, rotatably supporting said shift tube on said steer shaft, said transfer pin, extending through said steer shaft, operatively connecting said threaded member with said inner race, and lever means operatively connected to said shift tube, whereby said shift tube is moved linearly when said control shaft is rotated relative to said steer shaft and said shift tube is stationary when said control shaft and said steer shaft are rotated in unison.

2. A steering column comprising in combination a support tube; rotary steering means including a steer shaft, having diametrically opposed axially elongated slots spaced from one end thereof, rotatably supported in said support tube, and a steering wheel secured to said steer shaft; and transmission shift control means including a control shaft rotatably supported and centrally located in said steering wheel coaxial with said steer shaft and having a threaded portion and a spline portion on opposite ends thereof, a control knob drivingly connected to said control shaft at said splined portion and being selectively rotatable to predetermined positions; detent means for operatively connecting said control knob and control shaft with said steering wheel including detent roller means secured to said steering wheel and detent cam means drivingly connected to said splined portion of said control shaft for engaging said detent roller means and establishing said predetermined positions of said control knob, shift transfer means including a threaded member engaging said threaded portion of said control shaft within said steer shaft, bearing means surrounding a portion of said steer shaft, pin transfer means extending through said elongated slots in said steer shaft for operatively connecting said threaded member and said bearing means, and a shift tube operatively connected to said bearing means of said shift transfer means so that said shift tube is moved linearly when said control knob is rotated, relative to said steering wheel, to said predetermined positions and is stationary when said control knob and said steering wheel are rotated in unison.

References Cited

UNITED STATES PATENTS

| 2,896,470 | 7/1959 | Grady | 74—484 |
| 2,896,471 | 7/1959 | Hause | 74—484 |

MILTON KAUFMAN, Primary Examiner